(12) United States Patent
Bear

(10) Patent No.: US 10,570,819 B1
(45) Date of Patent: Feb. 25, 2020

(54) ENERGY TEST METHOD FOR DETERMINING FUEL CONSUMPTION OF A VEHICLE

(71) Applicant: Daryl Bear, Delaware (CA)

(72) Inventor: Daryl Bear, Delaware (CA)

(*) Notice: Subject to any disclaimer, the term of this patent is extended or adjusted under 35 U.S.C. 154(b) by 394 days.

(21) Appl. No.: 15/419,282

(22) Filed: Jan. 30, 2017

(51) Int. Cl.
*F02B 77/08* (2006.01)
*G01M 17/00* (2006.01)
*G06F 17/18* (2006.01)
*B62D 35/00* (2006.01)
*B62D 65/02* (2006.01)

(52) U.S. Cl.
CPC ........... *F02B 77/084* (2013.01); *G01M 17/00* (2013.01); *G06F 17/18* (2013.01); *B62D 35/001* (2013.01); *B62D 65/02* (2013.01)

(58) Field of Classification Search
None
See application file for complete search history.

(56) References Cited

U.S. PATENT DOCUMENTS

| | | | |
|---|---|---|---|
| 8,554,513 B2 | 10/2013 | Kersey et al. | |
| 8,604,920 B2 | 12/2013 | Armitage et al. | |
| 9,390,062 B1* | 7/2016 | Ashton | G07C 5/008 |
| 2009/0049740 A1* | 2/2009 | Hurst | C10L 1/14 |
| | | | 44/411 |
| 2010/0057339 A1* | 3/2010 | Pryakhin | G01C 21/3469 |
| | | | 701/532 |
| 2010/0077656 A1* | 4/2010 | Yuen | C10L 1/14 |
| | | | 44/451 |
| 2011/0060517 A1* | 3/2011 | Kono | G01C 21/3469 |
| | | | 701/123 |
| 2012/0109579 A1* | 5/2012 | Kersey | G01D 21/00 |
| | | | 702/182 |
| 2014/0117712 A1* | 5/2014 | Butler | B62D 25/188 |
| | | | 296/180.2 |
| 2014/0350763 A1* | 11/2014 | Granato | B60W 50/0097 |
| | | | 701/22 |
| 2015/0302319 A1* | 10/2015 | Elder | G06Q 10/0831 |
| | | | 700/291 |

OTHER PUBLICATIONS

SAE Revised J1321 Standard Fuel Consumption Test Procedure—Type II, Published Feb. 2012 (Year: 2012).*

* cited by examiner

*Primary Examiner* — Todd M Melton
*Assistant Examiner* — Jason R Roberson
(74) *Attorney, Agent, or Firm* — Trego, Hines & Ladenheim, PLLC; Brandon Trego; Jonathan Hines

(57) ABSTRACT

An energy test method configured to determine fuel consumption of a vehicle is disclosed. The method includes the steps of installing at least one sensor on the vehicle; connecting the at least one sensor to a data recorder; running a baseline test lap on a pre-determined circuit; using the data recorder to record data from the at least one sensor while running the baseline test lap; modifying the vehicle; running a modified test lap on the pre-determined circuit; using the data recorder to record data from the at least one sensor while running the modified test lap; and calculating a fuel savings between the modified test lap and the baseline test lap.

17 Claims, 4 Drawing Sheets

ENERGY TEST METHOD FOR DETERMINING FUEL CONSUMPTION OF A VEHICLE

BACKGROUND OF THE INVENTION

This invention relates generally to a method of determining fuel consumption and, more particularly, to an energy test method for measuring and reducing real world fuel consumption.

While the discussion below is directed to heavy duty vehicles, such as "tractors" and/or "tractor-trailers", it should be appreciated that the method of the current invention applies generally to the determination of and the reduction of real world fuel consumption.

The transportation industry is vital to small and large businesses alike which need to deliver a product to a store, warehouse facility, and/or to a consumer directly. One of the preferred ways to transport products is the use of heavy duty vehicles like those used in the trucking industry. One of, if not, the biggest costs for a trucking company is fuel. For example, the purchase price of a new "tractor" in the trucking industry is approximately $125,000. During the tractor's lifetime it may consume over $400,000 in fuel—over three times the purchase price of the vehicle. In order to maximize profitability and meet government mandates on fuel consumption, it is essential for these companies to implement fuel savings strategies.

In the United States, diesel fuel prices remained fairly flat between 1994 and 2002 with a minimum fuel price of $0.95/gallon in 1999; however, in 2002, the price of diesel fuel began to increase with a high fuel price of $4.76/gallon in 2008. Such rises in fuel price directly impact not only the profits of a trucking company but also the cost of goods to a consumer. While fuel prices have declined to about $2.40/gallon today from the high in 2008, volatility still prevails.

In addition to fuel prices, the Environmental Protection Agency (EPA) has set new fuel standards for combination tractors beginning in 2021. The standards are increased incrementally through 2024 with full adoption by 2027 and require twenty-five percent lower $CO_2$ emissions and fuel consumption by 2027. The EPA recognizes that the standards will not be met by simply improving engine efficiency and, as a result, have made it clear that the twenty-five percent reduction maybe accomplished by the implementation of several strategies such as aerodynamics, low rolling resistance tires, weight reduction, extended idle reduction technologies, automatic tire inflation, increased engine fuel efficiency, and other suitable strategies.

Unfortunately, the trucking industry has struggled to reliably reduce fuel consumption because it has lacked a reliable means for measuring fuel savings. Typically, fuel economy test results are specific to the conditions the test is performed in, which makes it difficult to determine the true fuel savings of a fuel savings strategy. Since the test conditions are almost always different to a trucking company's real-world operating conditions, it is difficult to determine how much fuel and money will be saved in the conditions (such as temperature, wind, altitude, and vehicle speed) their vehicles operate in.

Further, test conditions inherently vary from one test to another, which affects the test results. Thus, when testing multiple fuel saving strategies (i.e. in multiple tests) it is difficult to quantify the actual difference in fuel savings between the various strategies, thereby making it difficult to choose the appropriate fuel saving strategy. The trucking industry as a whole relies on published test results to compare various fuel saving strategies, but since the test results are dependent on the conditions tested in, an "apples to apples" test is impossible.

As a result, determining which fuel savings strategy provides the best fuel savings result is unpredictable and results in added financial risk, causing the trucking industry to become hesitant to invest in and/or adopt fuel saving strategies since they are unsure of the actual fuel savings from one strategy to the next. In fact, the EPA and North American Council for Freight Efficiency (NACFE) have stated that the lack of credible information on fuel efficiency is one of the major barriers to improving the trucking industry due to confusion in regards to fuel economy improvements and an inability to predict fuel savings and financial return-on-investment. Thus, trucking companies continue to waste fuel and money and pollute unnecessarily.

To make reliable decisions on fuel saving strategies, trucking companies must quantify the fuel savings they will experience in their fleet's real-world operations since that determines how much money the strategy being considered will actually save their company. The common practice is to conduct a long-term test whereby they employ the fuel savings strategy being considered on one or more vehicles and track its fuel economy over several months (often up to 12 months). Unfortunately, there are many difficulties with this method that impede fuel savings, such as poor test accuracy caused by continuously changing variables, maintenance and breakdown issues that affect fuel economy and skew results, and driver behavior which also skews results. These tests take a significant amount of time and manpower to conduct since a person must continuously track the fuel economy, maintenance, and other variables of the vehicle where the strategy is being tested. Due to the length of time required and the workload of long-term testing, only a small number of fuel saving strategies can be evaluated at one time in a company, thereby slowing progress and adoption. Overall, the method of measuring real-world fuel savings by employing the strategy in a fleet is not highly effective. Most attempts provide inconclusive results. Due to the lack of precision, current long term testing cannot detect fuel savings or differentiate between similar strategies.

Accordingly, there is a need for an improved method of testing fuel saving strategies to determine which fuel saving strategies are best suited for a particular fleet and to bring the trucking industry into compliance with the EPA's new standards.

BRIEF SUMMARY OF THE INVENTION

This need is addressed by the present invention, which provides an energy test method that provides reliable and accurate data on fuel saving strategies and allows companies to make informed decisions that allow trucking companies to adopt fuel saving strategies faster, easier, and without risk, thereby reducing fuel consumption and pollution.

According to one aspect of the invention, an energy test method configured to determine fuel consumption of a vehicle includes the steps of installing at least one sensor on the vehicle; connecting the at least one sensor to a data recorder; running a baseline test lap on a pre-determined circuit; using the data recorder to record data from the at least one sensor while running the baseline test lap; modifying the vehicle; running a modified test lap on the pre-determined circuit; using the data recorder to record data from the at least one sensor while running the modified test lap; and calculating a fuel savings between the modified test lap and the baseline test lap.

According to another aspect of the invention, an energy test method configured to determine fuel consumption of a vehicle includes the steps of deploying sensors on the vehicle and connecting the sensors to a data recording system; performing a baseline vehicle test along a pre-determined circuit wherein the baseline vehicle test includes at least one lap around the pre-determined circuit; using the data recording system to record data from the sensors during the baseline vehicle test; modifying the vehicle by performing one or more actions; performing a modified vehicle test along the pre-determined circuit wherein the modified vehicle test includes at least one lap around the pre-determined circuit; using the data recording system to record data from the sensor during the modified vehicle test; downloading the baseline vehicle test data and modified vehicle test data; and calculating a fuel savings between the modified vehicle test and the baseline vehicle test.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
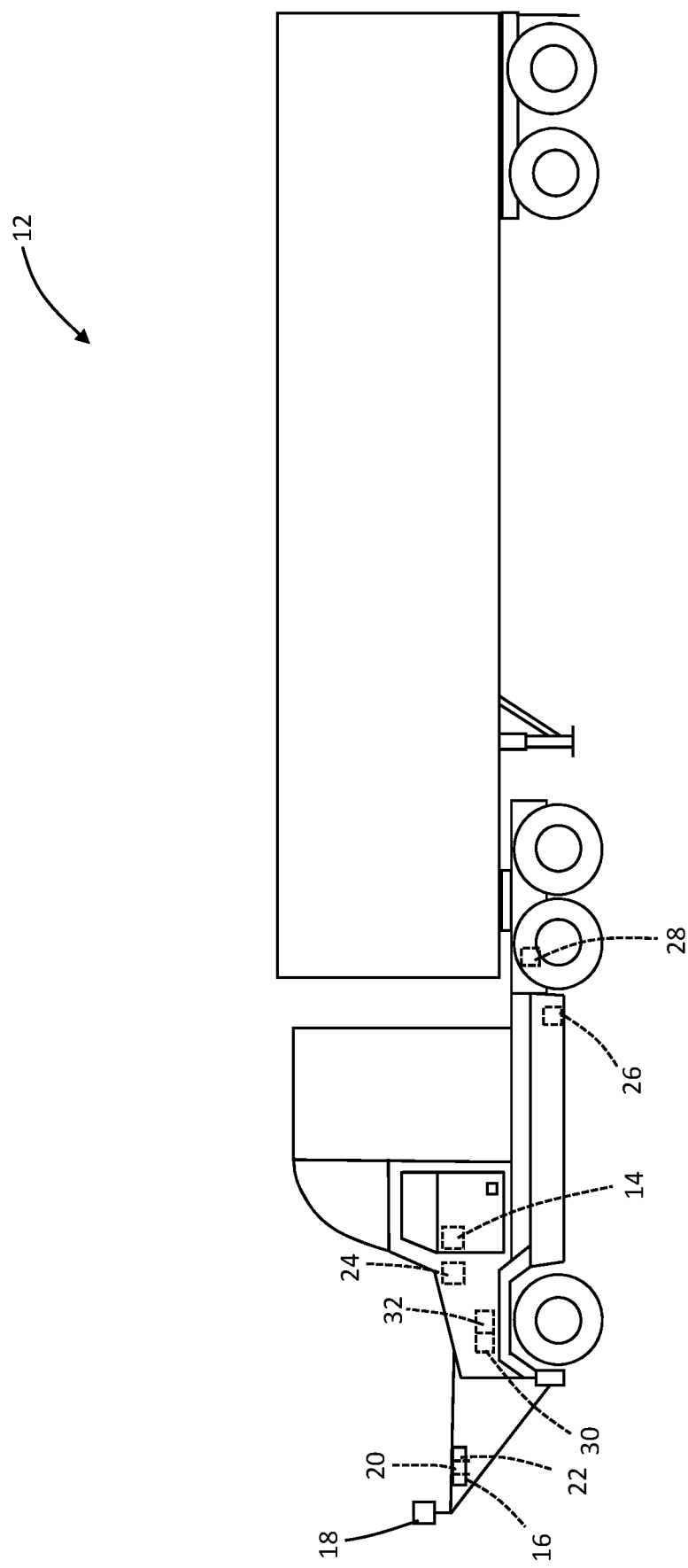
FIG. 1 is a schematic of a heavy duty vehicle with sensors installed for testing according to an aspect of the invention.
Figure 2:
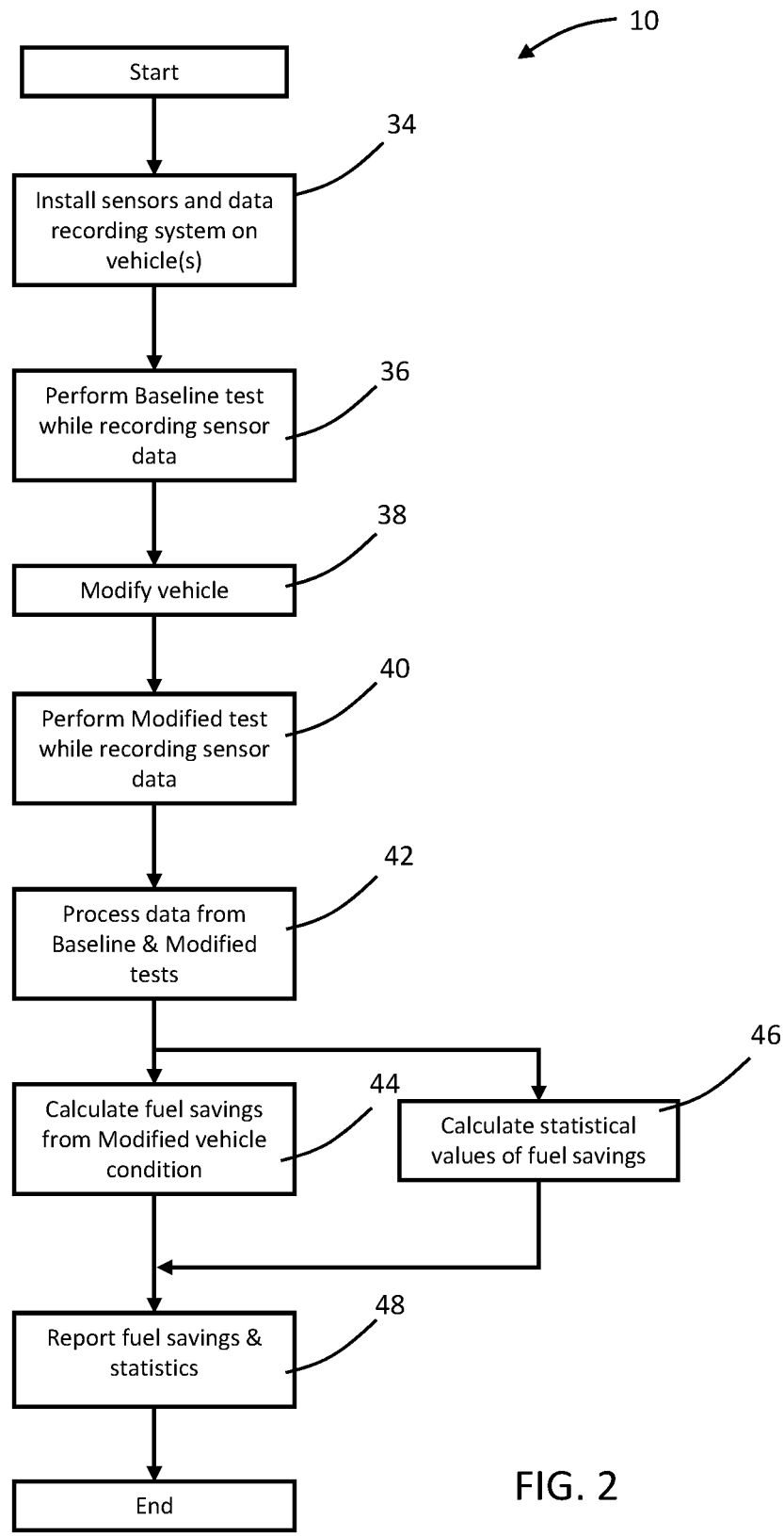
FIG. 2 is a flow diagram of an exemplary fuel saving strategy testing method.

Referring to the drawings wherein identical reference numerals denote the same elements throughout the various views, FIGS. 1 and 2 illustrate an exemplary energy test method 10 for determining fuel consumption in a vehicle 12. While a heavy duty vehicle (tractor-trailer) is depicted in FIG. 1, it should be appreciated that the energy test method 10 may be employed on any suitable vehicle where fuel consumption testing is desired.

The energy test method 10 utilizes a plurality of sensors deployed on vehicle 12 and connected to a data recording system 14 to capture data during a fuel efficiency test of the vehicle 12. It should be appreciated that the data recording system may be connected to the systems by "hard-wire" or by wireless communications. As shown, the vehicle 12 is fitted with a dynamic air pressure sensor 16, an air speed direction sensor 18, an ambient air pressure sensor 20, an ambient air temperature sensor 22, a global positioning sensor (GPS) 24, a ground temperature sensor 26, a tire pressure sensor 28, a fuel flow meter 30, and a fuel temperature sensor 32. Additionally, the vehicle's on board computer and associated sensors may be connected to the data recording system 14 to capture data related to the engine, transmission, speeds, etc. It should be appreciated that additional sensors may be deployed on vehicle 12 to gather additional data if desired. It should also be appreciated that the energy test method 10 may use data from all of the sensors deployed on vehicle 12 or use selected data from selected sensors.

In general, the energy test method 10 is an "on-road" test, meaning it uses vehicle(s) being driven at speed as opposed to being stationary on a testing apparatus. The test conditions for the energy test method 10 are also similar to the real-world operating conditions for the vehicle(s); thus, making the collected data more relevant to daily operations. The vehicle(s) repeat a specific route numerous times (typically 5-15 iterations or "laps" of a circuit).

As illustrated in FIG. 2, once the sensors and data recording system 14 are deployed onto the vehicle 12, block 34, a baseline test, block 36, is conducted to quantify a starting point for fuel consumption of the vehicle 12. As discussed above, each test includes multiple laps of a circuit. The baseline test, block 36, may be conducted using one vehicle or two vehicles. If two vehicles are used, one of the vehicles remains unmodified throughout the test and becomes a "comparison" for all modifications made to the other vehicle. This helps to further account for changing conditions during testing.

The vehicle 12 is then modified, block 38, and a modified test run is made, block 40. The step of modifying the vehicle 12 includes one or more actions of: installing components, changing components, removing components, and adjusting components. For example, installing components could include installing spoilers on a trailer or on top of a cab of the vehicle. Changing components could include changing original wheel bearings out for new wheel bearings or switching out one manufacturer's spoiler for another manufacturer's spoiler. Removing components could be removing components that increase weight, etc. and adjusting components could include adjusting air pressure in the tires or changing the angle of an air damn or spoiler. The modified test run, block 40, is performed for each individual modification to allow a comparison between the baseline and the modified test run.

Once the data from each of the sensors is recorded by the data recording system 14, the data from the baseline test and the modified test is processed, block 42, to determine if the modification decreased fuel consumption. In processing the data, block 42, calculations are performed for force and energy experienced by the vehicle by using data from the dynamic air pressure sensor 16, air speed direction sensor 18, ambient air pressure sensor 20, ambient air temperature sensor 22, GPS 24, ground temperature sensor 26, and tire pressure sensor 28. Energy used in fuel consumed is also calculated using data from the fuel flow meter 30 and fuel temperature sensor 32. The energy from the fuel is then compared to the force experienced by the vehicle. In the prior art, testers measure fuel consumption but do not measure energy consumption and energy acting on the vehicle 12 (wind drag, rolling resistance, etc.). In other words, they do not account for vehicle variables such as speed, operating duty cycle, and climate. By using energy, the method 10 can more accurately decipher a real change on the vehicle from a change in conditions such as environment, like wind, or driving.

The calculations used to process the baseline data and the modified data are as follows. The calculations may be performed on a computing device. An example of a suitable computing device includes a conventional microcomputer (sometimes referred to as a personal computer or "PC"). However, any device capable of executing a program instruction set to analyze the data may be used. Also, it is noted that the analysis method described herein may be integrated into existing systems which already include data collection and/or processing capability. For example, known types of microprocessor-based electronics suitable for collecting and/or processing data.

1. Baseline Test Calculations:
   a. Calculate vehicle theoretical energy consumption using data from the sensors ($E_{Theo}$). $E_{Theo}$ represents energy acting on the vehicle from both outside conditions and vehicle conditions such as aerodynamics, tire rolling resistance, etc.

$E_{Theo} = E_{Aero\ Drag} + E_{Rolling\ Resistance} + E_{Acceleration} + E_{Auxiliary\ Power} + \ldots$ b. Repeat step 1a for every lap of baseline test, isolating an $E_{Theo}$ value for each lap.

c. Calculate vehicle actual energy consumption ($E_{Actual}$) from fuel consumption using the fuel flow meter 30 and fuel temperature sensor 32.

$E_{Actual} = E_{Fuel\ Used} * \text{Powertrain Efficiency}$ d. Repeat step 1c for every lap of the baseline test, isolating an $E_{Actual}$ value for each lap, i.e., like is done in 1b for theoretical energy.

2. Energy Ratios

Note: In this step, the effect of outside forces are accounted for mathematically to compare to fuel consumption and this is where accuracy/reliability are improved.

a. Calculate the ratio of energy from actual (fuel) versus the theoretical energy for each lap.

Energy Ratio = $E_{Actual}/E_{Theo}$ b. Repeat step 2a for each lap.

3. Accuracy and Statistics a. Calculate Confidence Interval (CI) of Energy Ratio for Baseline Laps.

b. Using Energy Ratio values and Confidence Interval values as a guide, identify if any laps have errors (can be caused by driver error).

c. Omit any error laps.

d. Calculate the Minimum and Maximum Energy Ratio values using the CI values.

(Energy Ratio)$_{Minimum}$ = Energy Ratio − CI value
(Energy Ratio)$_{Maximum}$ = Energy Ratio + CI value 4. Modified test calculations a. Repeat steps 1, 2, 3 for modified test run.

5. Calculate Minimum and Maximum Energy Ratio Differences a. Ratio 1 (R1) = (Energy Ratio)$_{Minimum\ Baseline}$ − (Energy Ratio)$_{Maximum\ Modified}$
Ratio 2 (R2) = (Energy Ratio)$_{Minimum\ Baseline}$ − (Energy Ratio)$_{Minimum\ Modified}$
Ratio 3 (R3) = (Energy Ratio)$_{Maximum\ Baseline}$ − (Energy Ratio)$_{Maximum\ Modified}$
Ratio 4 (R4) = (Energy Ratio)$_{Maximum\ Baseline}$ − (Energy Ratio)$_{Minimum\ Modified}$ b. Identify Minimum and Maximum Energy Ratio Difference changes using values of R1 through R4
Energy Ratio Difference Minimum = Minimum (R1, R2, R3, R4)
Energy Ratio Difference Maximum = Maximum (R1, R2, R3, R4)

With the baseline and modified test calculations complete, fuel savings and statistical values are calculated, blocks 44 and 46, to determine the difference in vehicle fuel efficiency between the baseline and modified conditions. These values are calculated as follows.

1. Calculate Fuel Savings a. Calculate fuel savings per lap using the equation
Fuel Savings Per Lap = [[(Energy Ratio)$_{Baseline}$ − (Energy Ratio)$_{Modified}$] * ($E_{Theo}$)$_{Modified}$] / [Energy Density of Fuel * Powertrain Efficiency]

b. Calculate fuel savings for vehicle on-road use
Fuel Savings = (Fuel Savings per Lap) / (Total Fuel Used per Lap) * (Fuel Consumption Value of Vehicle During Test)

2. Statistical Values of Fuel Savings a. Calculate the minimum and maximum fuel savings per lap. Note: values based on Confidence Interval values from step 6 and therefore same Confidence Interval validity.

(Fuel Savings per Lap)$_{Minimum}$ = [[(Energy Ratio)$_{Baseline\ Max}$ − (Energy Ratio)$_{Modified\ Min}$] * ($E_{Theo}$)$_{Modified}$] / [Energy Density of Fuel * Powertrain Efficiency]

(Fuel Savings per Lap)$_{Maximum}$ = [[(Energy Ratio)$_{Baseline\ Min}$ − (Energy Ratio)$_{Modified\ Max}$] * ($E_{Theo}$)$_{Modified}$] / [Energy Density of Fuel * Powertrain Efficiency]

b. Calculate minimum and maximum fuel savings for vehicle on-road use.

Once the fuel savings and statistics are calculated, the values can then be reported, block 48, to determine which vehicle modifications, whether individually or combined, provide the best return on investment and/or provide the most fuel consumption reduction under real world conditions.

Example 1

In a hypothetical example, trucking company "ABC Trucking" has 1000 tractors. The tractors travel 200,000 km (124,274 miles) each and consume 78,400 Liters (20,711 gallons) of fuel each. On average, the tractor's fuel consumption is 39.2 L/100 km (6.0 miles/gallon). ABC Trucking consumes 78,400,000 Liters (20,711,088 gallons) of fuel annually. At a fuel cost of $2.50 per gallon ($0.66 per Liter) in the United States, ABC Trucking spends $51,783,355 on fuel. ABC Trucking wants to know if installing aerodynamic tractor side fairings will save them fuel and money. A test is conducted using the energy test method of FIG. 2.

In accordance with the method 10, sensors and data recorders are installed on one or more of ABC Trucking's vehicle(s), Block 34. The sensors include a pilot tube (used to measure aerodynamic pressure), a differential pressure sensor (measures pilot tube aerodynamic pressure), a wind vane (measures direction of aerodynamic air flow), an ambient air temperature sensor, an ambient air pressure sensor, a global positioning system (GPS), a fuel flow meter, a ground temperature sensor, a tire temperature sensor, and a fuel temperature sensor. Data from the vehicle's own sensors are also recorded through a connection from the vehicle's onboard computer to the data recorders used for the energy test.

With the sensors and data recorders installed and operational, the vehicle is set up with a total weight of 33,000 kg (72,600 lbs) by attaching a trailer with weight therein. A baseline test commences, Block 36, using a private test track having a one-lap distance of 12.9 km (8 miles). The vehicle speed is set to 105 km/h (65.2 mph) and 13 laps around the track are conducted consecutively without stopping. Once the baseline test is complete, the vehicle is stopped, data is downloaded, and the aerodynamic side fairings are installed, Block 38. A modified test, Block 40, is performed by repeating the baseline test (same track, vehicle, driver, etc.) and recording sensor data. The vehicle is stopped after 13 laps and the data is downloaded. It should be appreciated that it is not always necessary to run the same number of laps between both the baseline test and the modified test. It should also be appreciated that data may be downloaded at any time during baseline and modified testing runs.

With the data from the test runs downloaded, calculations are performed for each lap. All calculations are completed using metric units and then converted, if necessary, to imperial units. While only Lap 1 calculations are shown below, it should be appreciated that those same calculations are performed for each of the 13 laps and averages obtained. With the exception of the Lap 1 calculations shown, all calculations are based on the entire 13 laps.

First, $E_{Theo}$ and $E_{Actual}$ are calculated. $E_{Actual}$=Fuel$_{Used}$*U*Fuel$_{Temperature}$ Factor*Engine Efficiency, where Fuel$_{Used}$=fuel used by vehicle during lap (measured using fuel flow meter); U=energy density of fuel (joules/kg, constant value); Fuel$_{Temperature\ Factor}$=values found in industry established tables; and Engine Efficiency=known value (constant during testing).

| | Lap 1 |
|---|---|
| $E_{Actual}$ = Fuel Used * U * Fuel Temperature Factor * Engine Efficiency (Baseline) | |
| Fuel used during lap (L) | 5.381 |
| Energy density of diesel fuel (joule/L) | 35,801,100 |
| Fuel Temperature (C) | 41.4 |
| Fuel Temperature Factor (unitless) | 0.9792 |
| Engine Efficiency (unitless) | 39.15% |
| $E_{Actual}$ (joules) | 73,852,046 |
| Avg Fuel Consumed per Lap (L) | 5.3690 |
| Avg. Fuel Consump. Per Lap (L/100 km) | 41.5979 |
| $E_{Actual}$ = Fuel Used * U * Fuel Temperature Factor * Engine Efficiency (Modified) | |
| Fuel used during lap (L) | 5.091 |
| Energy density of diesel fuel (joule/L) | 35,801,100 |
| Fuel Temperature (C) | 36.8 |
| Fuel Temperature Factor (unitless) | 0.9832 |
| Engine Efficiency (unitless) | 39.15% |
| $E_{Actual}$ (joules) | 70,152,745 |
| Avg Fuel Consumed per Lap (L) | 5.1399 |
| Avg. Fuel Consump. Per Lap (L/100 km) | 39.8225 |

$E_{Theo}=E_{Aero\ Drag}+E_{Rolling\ Resistance}+E_{Acceleration}+E_{Auxiliary\ Loads}+E_{Altitude}+E_{Idle}+E_{Friction}$ where:

$E_{Aero\ Drag}=d*P*C_d*A$ where d=distance traveled in a lap; P=pressure (measured value from pitot tube and sensor); $C_d$=coefficient of drag of the vehicle (constant value); and A=vehicle area (constant value, measured on the vehicle as width*height).

| | Lap 1 |
|---|---|
| $E_{Aero\ Drag} = d \cdot P \cdot C_d \cdot A$ (Baseline) | |
| Distance (m) | 12,907 |
| Pressure (pascal) | 440 |
| Coefficient of Drag (unitless) | 0.61 |
| Area of Vehicle (m²) | 10.2 |
| $E_{Aero\ Drag}$ (joules) | 35,335,236 |
| $E_{Aero\ Drag} = d \cdot P \cdot C_d \cdot A$ (Modified) | |
| Distance (m) | 12,907 |
| Pressure (pascal) | 467 |
| Coefficient of Drag (unitless) | 0.61 |
| Area of Vehicle (m²) | 10.2 |
| $E_{Aero\ Drag}$ (joules) | 37,503,534 |

$E_{Rolling\ Resistance}=d*C_{RR}*m*g$ where $C_{RR}$=coefficient of rolling resistance (known value with deviation based on tire temperature); m=mass of vehicle (known value, constant); and g=force of gravity (constant).

| | Lap 1 |
|---|---|
| $E_{Rolling\ Resistance} = d \cdot C_{RR} \cdot m \cdot g$ (Baseline) | |
| Distance (m) | 12,907 |
| Coefficient of Rolling Resitance (unitless) | 0.004706 |
| Mass (kg) | 33,000 |
| Force of Gravity (N/kg) | 9.81 |
| $E_{Rolling\ Resistance}$ (joules) | 19,662,524 |
| $E_{Rolling\ Resistance} = d \cdot C_{RR} \cdot m \cdot g$ (Modified) | |
| Distance (m) | 12,907 |
| Coefficient of Rolling Resitance (unitless) | 0.004706 |
| Mass (kg) | 33,000 |
| Force of Gravity (N/kg) | 9.81 |
| $E_{Rolling\ Resistance}$ (joules) | 19,662,524 |

$E_{Acceleration}=0.5*m((V_2)^2-(V_1)^2)$ where $V_2$=final velocity of vehicle and $V_1$=initial velocity of the vehicle.

| | Lap 1 |
|---|---|
| $E_{Acceleration} = 0.5 \cdot m \cdot ((v_2)^2 - (v_1)^2)$ (Baseline) | |
| Constant (0.5) | 0.5 |
| Mass (kg) | 33,000 |
| Velocity final (m/s) | 29.19 |
| Velocity initial (m/s) | 29.19 |
| $E_{Acceleration}$ (joules) | 0 |
| Average Vehicle Speed | 29.17m/s |
| $E_{Acceleration} = 0.5 \cdot m \cdot ((v_2)^2 - (v_1)^2)$ (Modified) | |
| Constant (0.5) | 0.5 |
| Mass (kg) | 33,000 |
| Velocity final (m/s) | 29.14 |
| Velocity initial (m/s) | 29.19 |
| $E_{Acceleration}$ (joules) | −53472 |

$E_{Auxilary\ Loads}=MFC_{Aux}*U*t$ where $MFC_{Aux}$=measured fuel consumption from auxiliary loads (measured value); U=energy density of fuel (joules/kg, constant value); and t=time.

| | Lap 1 |
|---|---|
| $E_{Auxiliary\ Loads} = MFC_{Aux} \cdot U \cdot t$ (Baseline) | |
| Measured Fuel Consumption of auxiliary loads (L/s) | 0.000236 |
| Energy density of diesel fuel (joule/L) | 35,801,100 |
| Time duration of lap (s) | 442.1 |
| $E_{Auxiliary\ Loads}$ (joules) | 3,737,127 |
| $E_{Auxiliary\ Loads} = MFC_{Aux} \cdot U \cdot t$ (Modified) | |
| Measured Fuel Consumption of auxiliary loads (L/s) | 0.000236 |
| Energy density of diesel fuel (joule/L) | 35,801,100 |
| Time duration of lap (s) | 442.9 |
| $E_{Auxiliary\ Loads}$ (joules) | 3,744,252 |

$E_{\Delta Altitude}=\Delta h*m*g$ where $\Delta h$=change in height of the vehicle.

$E_{\Delta Altitude} = \Delta h \cdot m \cdot g$ (Baseline)

|  | Lap 1 |
|---|---|
| Change in height (m) | 0.0 |
| Mass (kg) | 33,000 |
| Force of gravity (N/kg) | 9.81 |
| $E_{\Delta Altitude}$ (joules) | 0 |

$E_{\Delta Altitude} = \Delta h \cdot m \cdot g$ (Modified)

|  | Lap 1 |
|---|---|
| Change in height (m) | 0.0 |
| Mass (kg) | 33,000 |
| Force of gravity (N/kg) | 9.81 |
| $E_{\Delta Altitude}$ (joules) | 0 |

$E_{Idle} = MFC_{Idle} * U * t$ where $MFC_{Idle}$ = measure fuel consumption at engine idle.

$E_{Idle} = MFC_{Idle} \cdot U \cdot t$ (Baseline)

|  | Lap 1 |
|---|---|
| Measured Fuel Consumption at idle (L/s) | 0.00059722 |
| Energy density of diesel fuel (joule/L) | 35,801,100 |
| Time duration of lap (s) | 442.1 |
| $E_{Idle}$ (joules) | 9,452,734 |

$E_{Idle} = MFC_{Idle} \cdot U \cdot t$ (Modified)

| Measured Fuel Consumption at idle (L/s) | 0.000597 |
|---|---|
| Energy density of diesel fuel (joule/L) | 35,801,100 |
| Time duration of lap (s) | 442.9 |
| $E_{Idle}$ (joules) | 9,470,756 |

$E_{Friction} = d * \mu * m * g$ where $\mu$ = coefficient of friction for the drivetrain and wheels (known value, constant).

$E_{Friction} = d \cdot \mu \cdot m \cdot g$ (Baseline)

|  | Lap 1 |
|---|---|
| Distance (m) | 12,907 |
| Coefficient of friction (unitless) | 0.001 |
| Mass (kg) | 33,000 |
| Force of gravity (N/kg) | 9.81 |
| $E_{Friction}$ (j) | 4,178,383 |

$E_{Friction} = d \cdot \mu \cdot m \cdot g$ (Modified)

| Distance (m) | 12,907 |
|---|---|
| Coefficient of friction (unitless) | 0.001 |
| Mass (kg) | 33,000 |
| Force of gravity (N/kg) | 9.81 |
| $E_{Friction}$ (j) | 4,178,383 |

Using the above calculations, we end up with $E_{Theo}$ for both baseline and modified Lap 1 tests.

| $E_{Theo}$ (Baseline) | 72,366,004 |
|---|---|
| $E_{Theo}$ (Modified) | 74,505,978 |

With $E_{Theo}$ and $E_{Actual}$ calculated for each lap, energy ratio and confidence interval calculations may be performed and error laps omitted.

Energy Ratio = $E_{Actual}/E_{Theo}$ (Baseline)

|  | Lap 1 |
|---|---|
| $E_{actual}$ (joules) | 73,852,046 |
| $E_{theo}$ (joules) | 72,366,004 |
| Energy Ratio (unitless) | 1.0205 |

Energy Ratio = $E_{Actual}/E_{Theo}$ (Modified)

|  | Lap 1 |
|---|---|
| $E_{actual}$ (joules) | 70,152,745 |
| $E_{theo}$ (joules) | 74,505,978 |
| Energy Ratio (unitless) | 0.9416 |

Confidence Interval (Baseline)

| Energy Ratio Mean | 1.0190 |
|---|---|
| Sample size (unitless) | 13 |
| Standard deviation (unitless) | 0.0052 |
| Confidence Coefficient (unitless) | 2.179 |
| Confidence Invertal (unitless) | 0.0031 |

Confidence Interval (Modified)

| Energy Ratio Mean | 0.9503 |
|---|---|
| Sample size (unitless) | 12 |
| Standard deviation (unitless) | 0.0052 |
| Confidence Coefficient (unitless) | 2.201 |
| Confidence Invertal (unitless) | 0.0033 |

The minimum and maximum energy ratio values are then determined using the confidence interval (CI) values and the minimum and maximum energy ratio differences are determined.

(Baseline Energy Ratios)

| (Energy Ratio)$_{Minimum}$ = Energy Ratio Mean − CI value | 1.0158 |
|---|---|
| (Energy Ratio)$_{Maximum}$ = Energy Ratio Mean + CI value | 1.0221 |

(Modified Energy Ratios)

| (Energy Ratio)$_{Minimum}$ = Energy Ratio Mean − CI value | 0.9470 |
|---|---|
| (Energy Ratio)$_{Maximum}$ = Energy Ratio Mean + CI value | 0.9536 |

| Ratio 1 = (Energy Ratio)$_{Minimum\ Baseline}$ − (Energy Ratio)$_{Maximum\ Modified}$ | 0.0622 |
|---|---|
| Company Total Fuel Consumption Annual | 0.0688 |
| Price of Fuel | 0.0750 |
| Company Total Fuel Cost Annual | 0.0685 |
| Energy Ratio Difference Minimum = Maximum value of R1, R2, R3, R4 | 0.0622 |
| Energy Ratio Difference Minimum = Maximum value of R1, R2, R3, R4 | 0.0750 |

With the data processed, fuel savings may now be calculated where Fuel Savings Per Lap=[[(Energy Ratio)$_{Baseline}$−(Energy Ratio)$_{Modified}$]*(E$_{Theo}$)$_{Modified}$]/[Energy Density of Fuel*Powertrain Efficiency] and Fuel Savings=(Fuel Savings per Lap)/(Total Fuel Used per Lap)$_{Baseline}$*(Fuel Consumption Value of Vehicle During Test)$_{Baseline}$.

| Energy Ratio Baseline (unitless) | 1.0190 |
|---|---|
| Company Total Fuel Consumption Annual | 0.9503 |
| Price of Fuel | 74,330,491 |
| Company Total Fuel Cost Annual | 35,801,100 |
| Engine Efficiency (unitless) | 39.15% |

-continued

| | |
|---|---|
| Fuel Savings per Lap (L) | 0.3639 |
| Fuel Savings per Lap (L) | 0.3639 |
| Total Fuel Used per Lap (L) | 5.3690 |
| Fuel Consumption During Test (L/100 km) | 41.5979 |
| Fuel Savings (L/100 km) | 2.8195 |

The statistical values for minimum and maximum fuel savings per lap and vehicle on-road use may now be calculated.

Fuel Savings per Lap$_{Minimum}$=[[(Energy Ratio)$_{Baseline\ Max}$−(Energy Ratio)$_{Modified\ Min}$]*(E$_{Theo}$)$_{Modified}$]/[Energy Density of Fuel*Powertrain Efficiency]

| | |
|---|---|
| Energy Ratio Baseline Maximum (unitless) | 0.0622 |
| Company Total Fuel Consumptioin Annual | 74,330,491 |
| Price of Fuel | 35,801,100 |
| Company Total Fuel Cost Annual | 39.15% |
| Fuel Savings per Lap Minimum (L) | 0.3299 |

(Fuel Savings per Lap)$_{Maximum}$=[[(Energy Ratio)$_{Baseline\ Min.}$−(Energy RatiO)$_{Modified\ Max.}$]*(E$_{Theo}$)$_{Modified}$]/[Energy Density of Fuel*Powertrain Efficiency]

| | |
|---|---|
| Energy Ratio Baseline Maximum (unitless) | 0.0750 |
| (E$_{Theo}$)$_{Motified}$ (joules) | 74,330,491 |
| Energy density of diesel fuel (joule/L) | 35,801,100 |
| Engine Efficiency (unitless) | 39.15% |
| Fuel Savings per Lap Maximum (L) | 0.3979 |

(Fuel Savings)=(Fuel Savings per Lap)/(Total Fuel Used per Lap)$_{Baseline}$*(Fuel Consumption Value of Vehicle During) Test)$_{Baseline}$

| | | | | |
|---|---|---|---|---|
| Minimum Fuel Savings per Lap (L) | 0.3299 | | | |
| Maximum Fuel Savings per Lap (L) | 0.3979 | | | |
| Total Fuel Used per Lap (L) | 5.3690 | | | |
| Fuel Consumption During Test (L/100 km) | 41.5979 | MPG | Gal/1000 mi | |
| | | Baseline Savings | | |
| Fuel Savings Minimum (L/100 km) | 2.5562 | 5.65 6.07 | 176.9 164.9 | |
| Fuel Savings Maximum (L/100 km) | 3.0827 | Impr. 0.41 | Impr. −12.0 | |
| Gross $ Savings | Minimum | Average | Maximum | Accuracy (+/−) |
| Fuel Savings (L/100 km) | 2.56 | 2.82 | 3.08 | 0.26 |
| Fuel Savings per Year (L) | 5112 | 5639 | 6165 | +/−526 |
| Company Total Fuel Savings Annual ($) | $3,376,775 | $3,724,519 | $4,072,263 | $347,744 |

In summary, ABC Trucking will see a Gross Savings of $3,724,519 in fuel savings with the side fairings and each tractor will save 5,639 L of fuel. ABC Trucking will see a Net Savings (Profits) of $3,426,967 for an investment of $297,552; thus, providing a minimum return-on-investment (ROI) of 1035%.

| Net $ Savings (Profits) | |
|---|---|
| Product Cost | $1,127 |
| Product Life (years) | 4 |
| Installation Cost | $63 |
| Maintenance Cost (annual) | $52 |

Amortized Cost = (Number of Tractors) *(Product Cost + Installation Cost)/(Product Life) + Maintenance Cost

| | | | |
|---|---|---|---|
| Amortized Cost ($ per Year) | $297,552 | | |
| | Minimum | Average | Maximum |
| Fuel Savings ($/year) | $3,376,775 | $3,724,519 | $4,072,263 |
| Net Savings ($/year) | $3,079,223 | $3,426,967 | $3,774,711 |
| Return on Investment (ROI) | 1035% | 1152% | 1269% |

Figure 3:
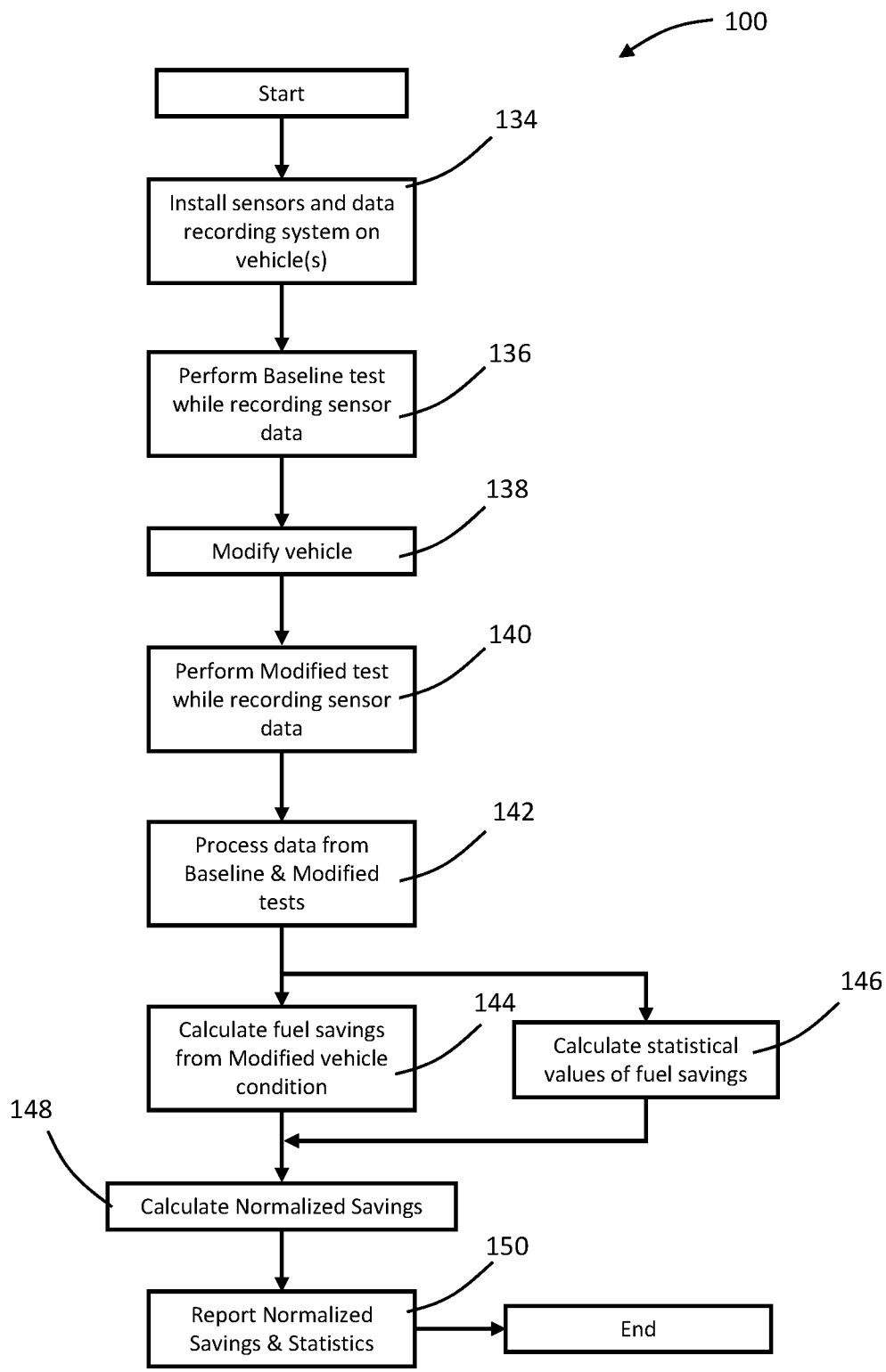
FIG. 3 is a flow diagram of an exemplary fuel saving strategy testing method.

Referring now to FIG. 3, an energy test method 100 is shown. The energy test method 100 uses several of the steps discussed above with respect to energy test method 10, but goes a step further to normalize test results. The primary benefit of energy test method 100 is that it allows test data to be translated from different sets of climate and/or vehicle conditions to provide for an apples to apples comparison. In other words, the test data is quantified to average vehicle conditions. For example, the method 100 translates the fuel savings value from the test condition to a specific condition, such as a trucking company's average conditions, such as temperature, speed, altitude, etc. to allow the company a more reliable value of fuel savings in real world operation. The method 100 also translates multiple test conditions to a common set of conditions to compare multiple test items since test conditions inherently vary from one test to another and a normalized condition is required.

For example, an aerodynamic device is tested in 91° F. (33° C.) weather. A trucking company in Wisconsin wants to know how that translates to their conditions. Wisconsin's average annual temperature is 48° F. (9° C.). The method 100 translates this data to provide the trucking company with reliable data for their conditions. The same can be done for differences in wind, vehicle speed, altitude (air pressure), etc.

Example 2

ABC Trucking now wants to translate the test results from the test conditions to its fleet's average temperature conditions. During the test, the air temperature was 33° C. (91° F.) whereas the fleet operates in Wisconsin where the average annual temperature is 9° C. (48° F.). The average fuel savings calculated for the side fairings above was 2.82 L/100 km. A different "Product XYZ" was tested in 9° C. (48° F.) and measured 2.53 L/100 km improvement in fuel consumption. Which saves more? Method 100 translates the results of one of the tests to the other tests conditions to allow an apples-to-apples comparison.

As illustrated, method 100 begins with installing sensors, block 134, performing baseline testing, block 136, modifying the vehicle, block 138, performing a modified test, block 140, processing data, block 142, and calculating fuel savings and statistical values, blocks 144 and 146. These steps are performed exactly like those described above.

Once the fuel savings and statistical values are calculated, a normalized savings is calculated, block 148, as follows.

1. Input test run values and results from blocks 142, 144, and 146
   a. Input fuel savings for on-road vehicle use (i.e. median, minimum, maximum)

|  | Minimum | Average | Maximum | Accuracy (+/−) |
|---|---|---|---|---|
| Fuel Savings (L/100 km) | 2.5562 | 2.8195 | 3.0827 | +/−0.2632 | b. Input test conditions for vehicle and environment (vehicle speed, wind speed, temperature, air pressure . . . ). These are provided by the sensors described above.

|  | Test Condition |  |
|---|---|---|
| Vehicle Speed (km/h) | 105.0 | Sensor data |
| Wind Speed (km/h) | 0.0 | Sensor data |
| Ambient Temperature (° C.) | 33.0 | Sensor data |
| Air Density (kg/m3) | 1.042 | Sensor data and calculations for air density |
| Vehicle Load (kg) | 33,000 | Test condition |

2. Input Normalized Condition Values
   a. Input same parameters as step 1b except for the fleet's normalized conditions (i.e. average temperature, wind desired vehicle speeds)

|  | Normalized Condition |
|---|---|
| Vehicle Speed (km/h) | 105.0 |
| Wind Speed (km/h) | 0.0 |
| Ambient Temperature (° C.) | 9.0 |
| Air Density (kg/m3) | 1.212 |
| Vehicle Load (kg) | 33,000 | b. Calculate normalized factor to apply to test condition results and equate normalized condition results. In this instance, the fuel savings are from an aerodynamic product, so only $E_{Aero\ Drag}$ is affected by the difference in test conditions to normalized conditions and all others can be ignored.

$$E_{Aero\ Drag} = d*\beta*C_d*A = d*\rho*C_d*A*v^2$$

Normalized Factor $= (E_{Theo})_{Normalized\ Condition} / (E_{Theo})_{Test\ Condition}$ which equals $(\rho*v^2)_{Normalized\ Condition} / (\rho*v^2)_{Test\ Condition}$

|  | Test Condition | Normalized Condition |
|---|---|---|
| $\rho$ = air density (kg/m³) = | 1.042 | 1.212 |
| v = velocity (m/s) = | 29.2 | 29.2 |
| Normalized Factor (unitless) |  | 1.163 |

3. Calculate Normalized Fuel Savings
   a. Calculate normalized fuel savings using input fuel savings and normalized factor Normalized Fuel Savings=(Test Fuel Savings)*(Normalized Factor)

| Test Fuel Savings (L/100 km) | 2.8195 |
|---|---|
| Normalized Factor (unitless) | 1.163 |
| Normalized Fuel Savings (L/100 km) | 3.2780 |

4. Calculate Normalized Fuel Savings Statistical Values
   a. Calculate Minimum and Maximum values based on values from 1a.

|  | Minimum | Average | Maximum | Accuracy (+/−) |
|---|---|---|---|---|
| Normalized Fuel Savings (L/100 km) | 2.9720 | 3.2780 | 3.5841 | +/−0.3061 |

Once the normalized fuel savings and statistics are calculated, the values can then be reported, block 150, to determine which vehicle modifications, whether individually or combined, provide the best return on investment and/or provide the most fuel consumption reduction under real world conditions. In summary, ABC Trucking will see a Gross Savings of $4,330,263 in fuel savings with the side fairings and each tractor will save 6,556 L of fuel. ABC Trucking will see a Net Savings (Profits) of $4,032,711 for an investment of $297,552; thus, providing a minimum return-on-investment (ROI) of 1219%.

| Gross $ Savings | Minimum | Average | Maximum | Accuracy (+/−) |
|---|---|---|---|---|
| Fuel Savings (L/100 km) | 2.97 | 3.28 | 3.58 | 0.31 |
| Fuel Savings per Year (L) | 5944 | 6556 | 7168 | +/−612 |
| Company Total Fuel Savings Annual ($) | $3,925,963 | $4,330,263 | $4,734,562 | $404,300 |
| Net $ Savings (Profits) |  |  |  |  |
| Product Cost | $1,127 |  |  |  |
| Product Life (years) | 4 |  |  |  |
| Installation Cost | $63 |  |  |  |
| Maintenance Cost (annual) | $52 |  |  |  |

-continued

| Amortized Cost = (Number of Tractors) *(Product Cost + Installation Cost)/(Product Life) + Maintenance Cost | | | |
|---|---|---|---|
| Amortized Cost ($ per Year) | $297,552 | | |
| | Minimum | Average | Maximum |
| Fuel Savings ($/year) | $3,925,963 | $4,330,263 | $4,734,562 |
| Net Savings ($/year) | $3,628,411 | $4,032,711 | $4,437,010 |
| Return on Investment (ROI) | 1219% | 1355% | 1491% |

Figure 4:
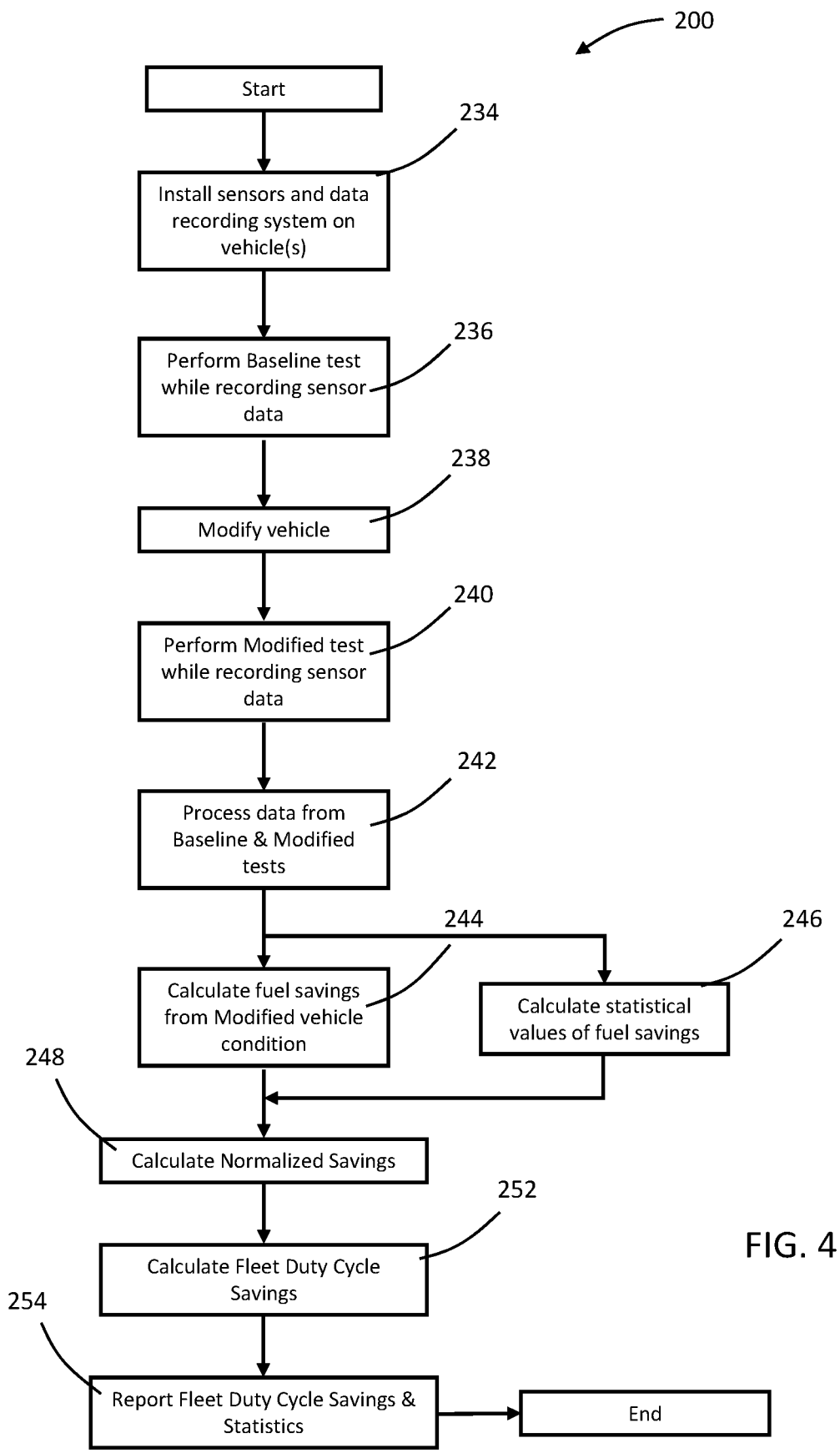
FIG. 4 is a flow diagram of an exemplary fuel saving strategy testing method.

Referring now to FIG. 4, energy test method 200 is used to calculate and report fleet duty cycle (DC) savings to reliably predict long-term fuel savings for a fleet of vehicles in everyday operation using short-term values of the energy test and data download from the fleet vehicles in everyday operation. This is essential to making reliable financial decisions for a company looking at fuel saving strategies. The energy test method 200 takes into account climate, vehicle speeds, duty cycle parameters, and other suitable factors, and allows a company to:
  a. get reliable answers on the fuel savings their company will actually experience in real world operations;
  b. allows many items to be tested in a short time, which allows for faster decisions and the ability to make decisions that optimize their savings (i.e. no longer limited by manpower); and
  c. allows them to detect even small savings and therefore optimize their decisions and savings potential.

As illustrated, method 200 begins with installing sensors, block 234, performing baseline testing, block 236, modifying the vehicle, block 238, performing a modified test, block 240, processing data, block 242, calculating fuel savings and statistical values, blocks 244 and 246, and calculating normalized savings, block 248. These steps are performed exactly like those described above.

Example 3

In real world operations, vehicles experience a variety of operational conditions including different speeds, payloads, accelerations/decelerations, and ascents/descents. This is referred to as duty cycle (DC). Climate is another factor. After being "normalized", block 248, the fuel savings values can be translated to each component of the fleet's duty cycle, block 252. These components can then be summed to arrive at the total fuel savings the fleet will experience.

1. Input Normalized Fuel Savings
  a. Input normalized fuel savings from block 248, including normalized fuel savings and normalized fuel savings statistics as described above with reference to block 148. (median, minimum, maximum)

| | Minimum | Average | Maximum | Accuracy (+/−) |
|---|---|---|---|---|
| Fuel Savings (L/100 km) | 2.97 | 3.28 | 3.58 | +/−0.31 |

2. Input fleet vehicle duty cycle (DC) parameters as they relate to duty cycle of fuel savings of item being analyzed (for an aerodynamic product, only vehicle speed and distances travelled are required)
  a. Input duty cycle speed parameters
  b. Input fleet vehicle travel distances
  c. Input fleet idle parameters
  d. Input fleet vehicle load weights
  e. Input fleet acceleration parameters
  f. Input fleet auxiliary fuel consumption parameters
  g. Input vehicle average fuel consumption

| Data Inputs | | | | | | |
|---|---|---|---|---|---|---|
| Speed$_{Duty\ Cycle}$ Parameters (km/h) | 0-10 | 10-20 | 20-30 | 30-40 | 40-50 | 50-60 |
| Vehicle Travel Distances (km) | 200 | 350 | 500 | 400 | 400 | 900 |
| Speed$_{Duty\ Cycle}$ Parameters (km/h) | 60-70 | 70-80 | 80-90 | 90-100 | 100-110 | 110-120 |
| Vehicle Travel Distances (km) | 1,200 | 9,300 | 20,150 | 64,000 | 102,000 | 600 |

3. Calculate duty cycle factor (DCF) as it pertains to fuel savings item
  a. Calculate duty cycle factor (DCF) for savings using formula for the specific parameter (i.e. aerodynamics, rolling resistance, etc.) (for aerodynamic product, only aerodynamic duty cycle is used for fuel savings)

$$DCF_{Aerodynamics} = (E_{Theo\ Aero\ Drag})_{Duty\ Cycle} / (E_{Theo\ Aero\ Drag})_{Normalized}$$

| Speed$_{Duty\ Cycle}$ (km/h) | 0-10 | 10-20 | 20-30 | 30-40 | 40-50 | 50-60 |
|---|---|---|---|---|---|---|
| Speed$_{Normalized}$ (km/h) | 105.0 | 105.0 | 105.0 | 105.0 | 105.0 | 105.0 |
| DCF$_{Aerodynamics}$ | 0.0023 | 0.0204 | 0.0567 | 0.1111 | 0.1837 | 0.2744 |
| Speed$_{Duty\ Cycle}$ (km/h) | 60-70 | 70-80 | 80-90 | 90-100 | 100-110 | 110-120 |
| Speed$_{Normalized}$ (km/h) | 105.0 | 105.0 | 105.0 | 105.0 | 105.0 | 105.0 |
| DCF$_{Aerodynamics}$ | 0.3832 | 0.5102 | 0.6553 | 0.8186 | 1.0000 | 1.1995 |

$DCF_{Rolling\ Resistance} = (E_{Theo\ Rolling\ Resistance})_{Duty\ Cycle} / (E_{Theo\ Aero\ Rolling\ Resistance})_{Normalized}$ $DCF_{Acceleration} = (E_{Acceleration\ Theo})_{Duty\ Cycle} / (E_{Acceleration\ Theo})_{Normalized}$ $DCF_{Auxiliary\ Loads} = (E_{Auxiliary\ Power\ Actual})_{Duty\ Cycle} / (E_{Auxiliary\ Power\ Actual})_{Normalized}$ $DCF_{Idle} = (E_{Idle\ Actual})_{Duty\ Cycle} / (E_{Idle\ Actual})_{Normalized}$ $DCF_{\Delta Altitude} = (E_{\Delta Altitude\ Theo})_{Duty\ Cycle} / (E_{\Delta Altitude\ Theo})_{Normalized}$ $DCF_{Friction} = (E_{Friction\ Theo})_{Duty\ Cycle} / (E_{Friction\ Theo})_{Normalized}$ 4. Calculate Duty Cycle Fuel Savings using 1a, 2, and 3a (median, minimum, maximum)
   a. Fuel Savings=(Normalized Fuel Savings)*[(Duty Cycle Factor)$_1$*(Distance Travelled)$_1$+(Duty Cycle Factor)$_2$*(Distance Travelled)$_2$+( )$_n$ . . . ]
   Whereby the ( . . . )$_1$+( . . . )$_2$+( . . . )$_n$ . . . Relates to multiple duty cycle sectors, such as speed segments (example below)

| Speed Range (km/h) | 0-10 | 10-20 | 20-30 | 30-40 | 40-50 | 50-60 |
|---|---|---|---|---|---|---|
| Duty Cycle Factor (unitless) | 0.0023 | 0.0204 | 0.0567 | 0.1111 | 0.1837 | 0.2744 |
| Distance in Range (km) | 200 | 350 | 500 | 400 | 400 | 900 |
| (Fuel Savings per Speed Range)$_{Minimum}$ (L) | 0.0 | 0.2 | 0.8 | 1.3 | 2.2 | 7.3 |
| (Fuel Savings per Speed Range)$_{Average}$ (L) | 0.0 | 0.2 | 0.9 | 1.5 | 2.4 | 8.1 |
| (Fuel Savings per Speed Range)$_{Maximum}$ (L) | 0.0 | 0.3 | 1.0 | 1.6 | 2.6 | 8.9 |

| Speed Range (km/h) | 60-70 | 70-80 | 80-90 | 90-100 | 100-110 | 110-120 |
|---|---|---|---|---|---|---|
| Duty Cycle Factor (unitless) | 0.3832 | 0.5102 | 0.6553 | 0.8186 | 1.0000 | 1.1995 |
| Distance in Range (km) | 1,200 | 53,450 | 30,000 | 64,000 | 48,000 | 600 |
| (Fuel Savings per Speed Range)$_{Minimum}$ (L) | 13.7 | 810.5 | 584.3 | 1557.0 | 1426.5 | 21.4 |
| (Fuel Savings per Speed Range)$_{Average}$ (L) | 15.1 | 893.9 | 644.5 | 1717.3 | 1573.4 | 23.6 |
| (Fuel Savings per Speed Range)$_{Maximum}$ (L) | 16.5 | 977.4 | 704.6 | 1877.7 | 1720.4 | 25.8 |

Using the data above, the aerodynamic product has a fuel economy test at 105 km/h (65 mph) and shows 38.78 L/100 km (7.28 gpm). It translates to 38.32 L/100 km (7.37 gpm) in the trucking company's normalized average climate conditions. A breakdown of the fleet's duty cycle shows its vehicles spend:
1. 27% of their time at 70-80 km/h;
2. 15% at 80-90 km/h;
3. 32% at 90-100 km/h;
4. 24% at 100-110 km/h; and
5. less than 1% at each category from 0-10, 10-20, 20-30, 30-40, 50-60, 60-70, and 110-120.

The fuel savings at 105 km/h (65 mph) and 38.32 L/100 km (7.28 gpm) is translated to each speed segment and then summed. It equates to 2.4405 L/100 km. This is the fuel savings the fleet will see in its real world operations, which allows them to calculate the precise financial savings. If each truck travels 200,000 km annually=2.4405×2000=4881 L (1289.4 gallons) per truck annually. Fuel priced at $2.55 per gallon=$3,287.97 saved annually per truck in fuel.

With the fleet duty cycle savings and statistics calculated, the results are reported, block 254. The report provides a fleet's real world fuel savings value of an item being tested. This step includes the steps of:
1. Report Fleet Duty Fuel Savings
   a. Report fleet duty cycle savings (median, i.e. average)
2. Report Duty Cycle Fuel Savings Statistics
   a. Report Confidence Interval Minimum and Maximum values. Note: This shows the user the "worst case scenario" and the "best case scenario" of what to expect in the fleet's real world vehicle conditions.

In summary, the Gross Savings from use of the aerodynamic product is $3,223,895 in fuel per year or 4,881 L of fuel per year. The Net Savings (Profits) is $2,926,343 for a return-on-investment (ROI) 983%.

| Gross $ Savings | Minimum | Average | Maximum | Accuracy (+/−) |
|---|---|---|---|---|
| Fuel Savings (L/100 km) | 2.21 | 2.44 | 2.67 | 0.23 |
| Fuel Savings per Year (L) | 4425.3 | 4881.0 | 5336.7 | +/−455.7 |
| Company Total Fuel Savings Annual ($) | $2,922,893 | $3,223,895 | $3,524,898 | $301,002 |

| Net $ Savings (Profits) | |
|---|---|
| Product Cost | $1,127 |
| Product Life (years) | 4 |
| Installation Cost | $63 |
| Maintenance Cost (annual) | $52 |

| Amortized Cost = (Number of Tractors) *(Product Cost + Installation Cost)/(Product Life) + Maintenance Cost | | | |
|---|---|---|---|
| Amortized Cost ($ per Year) | $297,552 | | |
| | Minimum | Average | Maximum |
| Fuel Savings ($/year) | $2,922,893 | $3,223,895 | $3,524,898 |
| Net Savings ($/year) | $2,625,341 | $2,926,343 | $3,227,346 |
| Return on Investment (ROI) | 882% | 983% | 1085% |

The foregoing has described energy test method for determining fuel consumption of a vehicle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. An energy test method configured to determine fuel consumption of a vehicle, comprising the steps of:
   (a) installing at least one sensor on the vehicle;
   (b) connecting the at least one sensor to a data recorder;
   (c) running a baseline test lap on a pre-determined circuit;
   (d) using the data recorder to record data from the at least one sensor while running the baseline test lap;
   (e) modifying the vehicle;
   (f) running a modified test lap on the pre-determined circuit;
   (g) using the data recorder to record data from the at least one sensor while running the modified test lap; and
   (h) calculating a fuel savings between the modified test lap and the baseline test lap, wherein the step of calculating a fuel savings includes the steps of:
      (i) using the data from the at least one sensor to calculate a theoretical energy consumption;
      (ii) using the data from the at least one sensor to calculate actual energy consumption from fuel consumption measured;
      (iii) calculating an energy ratio, the energy ration equal to the actual energy consumed divided by the theoretical energy consumed; and
      (iv) using the energy ratio to calculate the fuel savings.

2. The method according to claim 1, wherein the at least one sensor is selected from the group consisting of a dynamic air pressure sensor, an air speed direction sensor, an ambient air pressure sensor, an ambient air temperature sensor, a global positioning sensor, a ground temperature sensor, a tire pressure sensor, a fuel flow meter, and a fuel temperature sensor.

3. The method according to claim 1, wherein the step of modifying the vehicle includes the step of installing one or more aerodynamic components.

4. The method according to claim 1, wherein the step of modifying the vehicle includes the step of replacing a component on a vehicle with a new component.

5. The method according to claim 1, wherein the step of modifying the vehicle includes the step of removing a component from the vehicle.

6. The method according to claim 1, wherein the step of modifying the vehicle includes the step of adjusting a component on the vehicle.

7. The method according to claim 1, further including the step of normalizing the calculated fuel savings to compensate for a different environmental condition.

8. The method according to claim 7, further including the step of calculating a fleet duty cycle savings to determine a fuel savings for an entire fleet of vehicles.

9. An energy test method configured to determine fuel consumption of a vehicle, comprising the steps of:
   (a) deploying sensors on the vehicle and connecting the sensors to a data recording system;
   (b) performing a baseline vehicle test along a pre-determined circuit, the baseline vehicle test including at least one lap around the pre-determined circuit;
   (c) using the data recording system to record data from the sensors during the baseline vehicle test;
   (c) modifying the vehicle by performing one or more actions;
   (d) performing a modified vehicle test along the pre-determined circuit, the modified vehicle test including at least one lap around the pre-determined circuit;
   (e) using the data recording system to record data from the sensor during the modified vehicle test;
   (f) downloading the baseline vehicle test data and modified vehicle test data; and
   (h) calculating a fuel savings between the modified vehicle test and the baseline vehicle test, wherein the step of calculating a fuel savings includes the steps of:
      (i) calculating theoretical energy consumption using data from the sensors;
      (ii) calculating actual energy consumption from fuel consumption measured by one of the sensors;
      (iii) calculating an energy ratio, the energy ration equal to the actual energy consumed divided by the theoretical energy consumed; and
      (iv) using the energy ratio to calculate the fuel savings.

10. The method according to claim 9, further including the step of normalizing the calculated fuel savings to compensate for a different environmental condition.

11. The method according to claim 10, wherein the step of normalizing the calculated fuel savings further includes the step of determining a normalized factor and applying the normalized factor to the calculated fuel savings.

12. The method according to claim 9, further including the step of determining a fleet duty cycle and calculating a fuel savings for an entire fleet of vehicles.

13. The method according to claim 12, wherein the step of determining a fleet duty cycle further includes the step of recording distance and speed while the vehicle travels along the pre-determined circuit and dividing the recorded speed into multiple speed segments.

14. The method according to claim 13, further including the step of calculating a duty cycle factor for each speed segment.

15. The method according to claim 14, further including the step of applying the duty cycle factor for each segment to determine a fuel savings for each speed segment.

16. The method according to claim 15, further including the step of summing the fuel savings for each speed segment and determining fuel savings for an entire fleet of vehicles.

17. An energy test method configured to determine fuel consumption of a vehicle, comprising the steps of:
(a) installing at least one sensor on the vehicle;
(b) connecting the at least one sensor to a data recorder;
(c) running a baseline test lap on a pre-determined circuit;
(d) using the data recorder to record data from the at least one sensor while running the baseline test lap;
(e) modifying the vehicle;
(f) running a modified test lap on the pre-determined circuit;
(g) using the data recorder to record data from the at least one sensor while running the modified test lap;
(h) calculating a fuel savings between the modified test lap and the baseline test lap; and
(i) determining a fleet duty cycle and calculating a fuel savings for an entire fleet of vehicles, the step of determining a fleet duty cycle including the steps of:
(i) recording distance and speed while the vehicle travels along the pre-determined circuit and dividing the recorded speed into multiple speed segments;
(ii) calculating a duty cycle factor for each speed segment; and
(iii) applying the duty cycle factor for each segment to determine a fuel savings for each speed segment.

* * * * *